US006795490B2

United States Patent
Belotserkovsky

(10) Patent No.: US 6,795,490 B2
(45) Date of Patent: Sep. 21, 2004

(54) SIGNAL DETECTION IN A DIRECT-SEQUENCE SPREAD SPECTRUM TRANSMISSION SYSTEM

(75) Inventor: Maxim B. Belotserkovsky, Indianapolis, IN (US)

(73) Assignee: Thomson Licensing S.A., Boulogne-Billancourt Cedex (FR)

( * ) Notice: Subject to any disclaimer, the term of this patent is extended or adjusted under 35 U.S.C. 154(b) by 0 days.

(21) Appl. No.: 10/124,255

(22) Filed: Apr. 17, 2002

(65) Prior Publication Data

US 2003/0198286 A1 Oct. 23, 2003

(51) Int. Cl.[7] .............................................. H04B 1/707
(52) U.S. Cl. ...................... 375/150; 375/342; 375/343
(58) Field of Search ................................. 375/130, 140, 375/141, 142, 143, 145, 147, 149, 150, 152, 342, 354, 364, 365, 366, 367, 368, 343; 370/320, 335, 342, 503, 509

(56) References Cited

U.S. PATENT DOCUMENTS

| 5,790,537 | A | * | 8/1998 | Yoon et al. ................. 370/342 |
| 5,796,775 | A | * | 8/1998 | Aoyama ..................... 375/150 |
| 6,233,273 | B1 | * | 5/2001 | Webster et al. ............. 375/148 |
| 6,263,013 | B1 | * | 7/2001 | Hendrickson ............... 375/150 |
| 6,314,128 | B1 | * | 11/2001 | Bunker et al. .............. 375/149 |
| 6,331,998 | B1 | * | 12/2001 | Lin et al. .................... 375/143 |
| 6,411,610 | B1 | * | 6/2002 | Li et al. ..................... 370/335 |

* cited by examiner

*Primary Examiner*—Chieh M. Fan
(74) *Attorney, Agent, or Firm*—Joseph S. Tripoli; Robert B. Levy

(57) ABSTRACT

A receiver (10) achieves more reliable detection of signals transmitted by Direct Sequence Spread Spectrum Transmission by correlating received signals with a separate of N symbol patterns via N detector stages ($18_1$–$18_N$). A maximum peak power detecting mechanism ($24_1$–$24_N$, $26_1$–$26_N$ and 28) detects which of the N correlated symbol patterns has a maximum peak power, as well as the identity of each of the N patterns actually received and an index of the peak power in each symbol. A computing mechanism (30, 32 and 34) computes a running power average of the received signals, while a ratio computing stage (36) computes the ratio of the largest peak power of the N correlated symbol patterns to the running power average. A comparator stage (38 and 40) compares the ratio to a threshold value to determine a first symbol in the received signals. From knowledge of the first symbol received, the identity of that symbol, and the true burst location of the received symbol relative to a receiver time base can be determined, thus providing more reliable signal detection.

9 Claims, 1 Drawing Sheet

SIGNAL DETECTION IN A DIRECT-SEQUENCE SPREAD SPECTRUM TRANSMISSION SYSTEM

FIELD OF THE INVENTION

This invention relates to detection of signals transmitted by Direct Sequence Spread Spectrum Transmission.

BACKGROUND ART

Spread Spectrum Transmission is a technique for modulating radio signals by transmitting the signals in packetized form over a wider frequency band than is otherwise required for the content and then collecting the signals at a receiver on the original frequency. As compared to conventional transmission techniques, spread spectrum transmission affords greater security against interception because the signals are usually so inconspicuous to avoid detection by other than a corresponding receiver. Direct Sequence Spread Spectrum (DSSS) Transmission (also known as Direct Sequence Code Division Multiple Access or DC-CDMA) refers to a specific Spread Spectrum Transmission technique wherein the outbound signal is divided into many small segments. Each small segment is combined with a higher rate bit sequence (i.e., chipping code) for dividing the original according to a spreading ratio. Using a chipping code to divide the original signal allows for recovery of the data in the event of damage during transmission.

Reliable detection of DSSS transmissions, especially when such signals are packetized or bursty, requires determining when the signal is present as well as the transmission boundaries and finding the information-carrying correlation peak locations. This task becomes especially difficult upon the failure to lock in local sampling and/or carrier frequencies with the transmitting end, especially in the case of a low Signal-to-Noise Ratio (SNR).

Heretofore, DSSS signal detection has been accomplished by performing symbol-by-symbol peak magnitude detection. For every K chips (or 2*K samples, when 2-sample-per-symbol sampling is used), the sample with largest magnitude or power is detected and its location within the symbol is recorded. The presence of a signal and the true correlation peak locations are determined based on peak power thresholding against the background noise level and/or correlation peak index consistency. Detecting signals in this manner works reasonably well. However, when the SNR is low and other impairments are present, there exists a high probability that the peak location within a symbol will be incorrectly detected due to a large noise excursion etc. The prior art approach makes no distinction between information obtained on high-reliability symbols versus information received on low reliability symbols.

BRIEF SUMMARY OF THE INVENTION

Briefly, in accordance with present principles, there is provided a method for improved detection of signal patterns transmitted by Direct Sequence Spread Spectrum Transmission. In accordance with the method, received signal patterns are continuously correlated with each of N known symbol sequences. A ratio of peak power to running average power is determined on each of the N symbol sequences. A comparison is made between this ratio and a threshold value to determine the first symbol received which is typically the symbol whose associated signal first exceeds the threshold. The identity of the first symbol pattern corresponds to the particular one of the N correlated symbol patterns whose corresponding ratio first exceeded the threshold. The true burst location relative to the receiver time burst can be determined from an index of the peak power within the symbol pattern.

Detecting DSSS signals in this manner greatly improves signal/peak detection reliability when known symbol/bit patterns are transmitted. Further the method enables determination of which pattern has been transmitted which can be relayed to other elements requiring that information.

DETAILED DESCRIPTION

Figure 1:
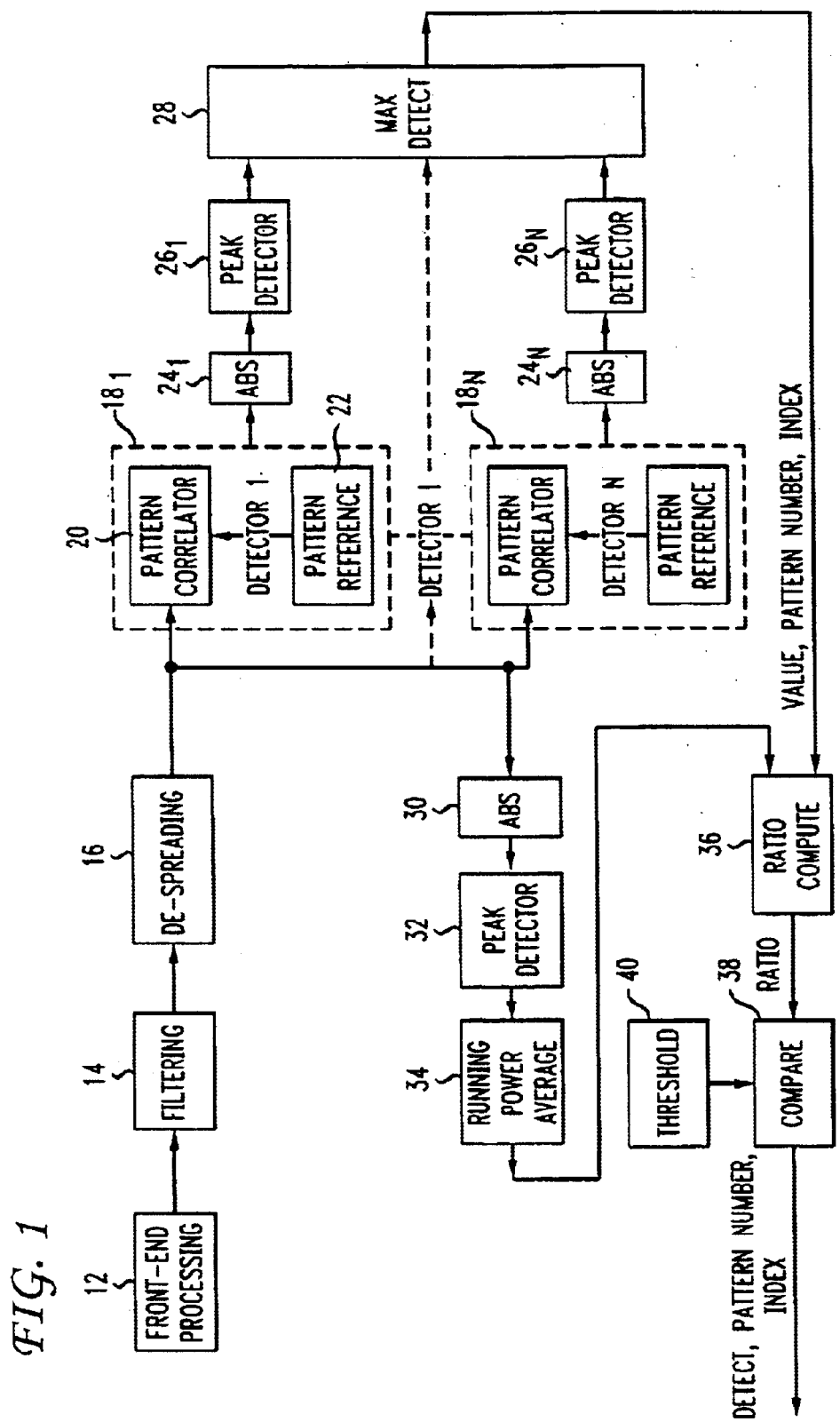
FIG. 1 illustrates a block schematic diagram of a Direct Sequence Spread Spectrum receiver in accordance with the present principles.

FIG. 1 depicts a block schematic diagram of a receiver 10 in accordance with the present principles that provides for improved signal detection, and in particular, for more reliable determination that a known pattern has been transmitted as well as more reliable determination of the true burst location of the symbol pattern relative to the receiver time base. A 'known pattern' possesses certain blocks within the body of a transmission burst that that are typically repeatedly transmitted (such as packet headers designating the transmission source, error-correction type etc.) and such blocks are not encoded by the forward-error correction code (FEC). Under such circumstances, such bit patterns unambiguously define corresponding symbol patterns, which can be identified when performing detection. Having knowledge of the possible symbol patterns and their location within the burst improves the reliability of detection.

The receiver 10 of FIG. 1 includes a front-end processing stage 12 that samples a received input signal to perform pulse shaping and to bring the signal to a near base band condition. A filtering stage 14 filters the output signal of the front end processing stage 12 to enhance the Signal-to-Noise Ratio (SNR). The filtering stage can also perform further pulse shaping when needed. A de-spreader 16 correlates the output signal of the filtering stage 14 with the spreading sequence.

The output signal of the de-spreading stage 16 passes to each of N detector stages $18_1$–$18_N$ wherein N is an integer corresponding to the number of known symbol patterns in the transmitted signal stream. Each of the N detector stages, as exemplified by the detector stages $18_1$ and $18_N$ depicted in FIG. 1, includes a pattern correlator 20 for correlating the output signal from the de-spreading stage 16 with a reference pattern from a reference pattern generator 22. The reference pattern generator 22 within each of the detector stages $18_1$–$18_N$ generates a reference pattern that represents a separate one of the N known symbol patterns.

Each of a plurality of power monitor stages $24_1$–$24_N$ measures the absolute magnitude (power) of the output signal of a corresponding one of the detector stages $18_1$–$18_N$, respectively. A separate one of peak detectors $26_1$–$26_N$ detects the peak magnitude (power) of the output signal of a corresponding one of the power monitoring stages $24_1$–$24_N$, respectively, and records the value of the peak magnitude and location within each symbol. The peak location is defined as the chip or sample number of the peak within the symbol and the location is output at a rate of once per symbol. A MAX detector stage 28 determines the largest of the individual peak magnitudes detected by the peak detectors $26_1$–$26_N$. Not only does the MAX detector 28 output the largest peak power value, the MAX detector also outputs the pattern number and an index of the peak value within the symbol which is indicative of the true burst location with respect to the receiver time base.

A power monitor stage 30 determines the raw magnitude (power) of the output signal of the de-spreading stage 16. A peak detector stage 32 determines the location of the peak power for each symbol in manner similar to each of the peak detectors $26_1$–$26_n$, except that peak detector 32 does so on the raw de-spreader output signal. A computing stage 34 computes the running power average of the output peaks of the peak detector 32, typically since the inception of reception. Alternatively, the computing stage 34 could determine the running power average by averaging the peak values from the peak detector 32 within a sliding window of given length.

A computing stage 36 receives the output signal of the computing stage 34 along with the output signal of the MAX detector 28 and computes the ratio of the largest of the peak magnitudes (powers) of the detectors $18_1$–$18_N$, as determined by the MAX detector 28, to the running peak power average, as computed by the computing stage 34. A comparator 38 compares the ratio computed by the ratio computing stage 36 to a threshold value.

Such a comparison will yield several significant pieces of information that greatly aid signal detection. The first of the N detector stages $18_1$–$18_N$ whose peak power yields a ratio of peak power to running power average exceeding the threshold value will correspond to the first symbol in the received signal pattern. The identity of the detector stage associated with the first such signal will correspond to the identity of the received one of the N symbol patterns. Thus for example, if the detector $18_i$ produced an output signal whose ratio of peak power to running power average first exceeded the threshold, then the $i^{th}$ symbol pattern was received. The index of the peak within the symbol associated with that symbol patterns indicates the true burst location relative to the time base of the receiver 10.

In practice, the value of the threshold signal produced by the threshold signal generator 40 is set from knowledge of the pattern sequence. For example, if the pattern length is L and the pattern sequence is normalized to unity power, then, in the absence of noise and phase offsets, the ratio of the largest pattern correlation magnitude peak to the average de-spreader peak magnitude output signal is approximately equal to L.

The operation of the receiver 10 described above relies on at least one of the following assumptions:

1. The beginning of the transmission bursts is known approximately prior to the application of the processing (with a possible inaccuracy of up to several symbol durations), possibly through the use of a coarse acquisition algorithm or some other means. In this way, the receiver 10 can be guaranteed to be turned on during a 'dead time' between the bursts with at least a 1-symbol margin, so that the location of the known pattern(s) uniquely defines the beginning (or some other unique point) of the transmission; or
2. The sought pattern(s) are guaranteed to not appear anywhere in the body of the transmission bursts other than in the uniquely defined locations known a-priori.

There is provided a method for detection of signals transmitted by Direct Sequence Spread Spectrum Transmission that greatly improves signal/peak detection reliability for known symbol/bit patterns, thus enabling a determination of which pattern has been received for relaying such information to other elements requiring that knowledge.

What is claimed is:

1. A method for improved detection of received signals transmitted by Direct Sequence Spread Spectrum Transmission, comprising the steps of:
   continuously correlating the received signals with each of N known symbol patterns, where N is an integer, to yield N correlated symbol patterns;
   determining which of the N correlated symbol patterns has a largest peak power;
   determining a running power average of the received signals;
   computing a ratio of the largest peak power of the N correlated symbol patterns to the running power average; and
   comparing the ratio to a threshold value to determine a first symbol in the received signals, an identity of the first symbol, and a true burst location of the first symbol relative to a receiver time base.

2. The method according to claim 1 wherein the determining steps are performed simultaneously.

3. The method according to claim 1 wherein step of determining which of the N correlated symbol patterns has the largest peak power comprises the steps of:
   (a) determining a power value for each of the N correlated symbol patterns;
   (b) detecting a peak within the power value for each of the N correlated symbol patterns; and
   (c) determining from the peak power values for the N correlated symbol patterns which symbol pattern has a maximum value as well an identity of each of the N patterns actually received and an index of the peak power within each symbol in each symbol pattern.

4. The method according to claim 1 wherein the identity of the first symbol corresponds to the one of the N correlated symbol patterns having the largest peak power.

5. The method according to claim 1 wherein the threshold value is determined from knowledge of the sequence of the received signals.

6. Apparatus for improved detection of signals transmitted by Direct Sequence Spread Spectrum Transmission, comprising:
   N detector stages, each correlating received signals with a separate one of N separate known symbol patterns where N is an integer, to yield N correlated symbol patterns;
   a maximum peak power detecting mechanism for: (a) detecting which of the N correlated symbol patterns output by the N detector stages has a maximum peak power, (b) determining an identity of each of the N symbol patterns actually received and (c) establishing an index of the peak power within the symbol in each received symbol pattern;
   a first computing mechanism for computing a running power average of the received signals;
   a second computing mechanism for computing a ratio of the maximum peak power, as established by the maximum peak power detecting mechanism, to the running power average; as established by first computing mechanism, and
   a comparator stage for comparing the ratio to a threshold value to determine a first symbol in the received signals, the first symbol having an identity corresponding to the one of the N correlated symbol patterns having the largest peak power, and the first symbol having a true burst location relative to a receiver time base corresponding to the index of the peak power within that symbol.

7. The apparatus according to claim 6 wherein each of the N detector stages comprises:

a pattern generator for generating a separate one of N possible known symbol patterns; and a pattern correlator for correlating the received signals with the separate one of the N known symbol patterns produced by the pattern generator.

8. The apparatus according to claim 6 wherein the maximum peak power detecting mechanism comprises:

N power monitors, each measuring the power of a corresponding one of the N correlated symbol patterns;

N peak detectors, each detecting a peak in the power measured by a corresponding one of the power monitors; and a maximum peak power detecting stage for determining which of the N correlated symbol patterns has a peak power, as detected by a separate one of the peak detectors as well the identity of each of the N patterns actually received and the index of the peak power within each symbol in each symbol pattern.

9. The apparatus according to claim 6 wherein the first computing mechanism comprises:

a power monitor for measuring the power of the received signals;

a peak detector for detecting a peak in the power measured by the power monitor; and a computing stage responsive to the peak in the power measured by the peak detector for computing a running power of the peaks measured by the peak detector.

\* \* \* \* \*